Dec. 26, 1967  F. MASSA  3,360,772
GEOPHONE
Filed May 26, 1966

Inventor
FRANK MASSA
By Louis Bernal
Atty.

United States Patent Office 3,360,772
Patented Dec. 26, 1967

3,360,772
GEOPHONE
Frank Massa, Cohasset, Mass., assignor to Massa Division, Dynamics Corporation of America, Hingham, Mass.
Filed May 26, 1966, Ser. No. 553,131
13 Claims. (Cl. 340—17)

ABSTRACT OF THE DISCLOSURE

A hollow, somewhat cylindrically shaped, housing body terminates at one end in a spike-like tip and at the other end in an antenna. The spike penetrates the ground and acoustically couples the housing to the earth. A piezoelectric, bi-laminar element is suspended across the interior of the housing. A weight cemented to this element vibrates and the element produces electrical signals responsive to earth vibrations. These signals are applied to the input of a radio transmitter which broadcasts over the antenna.

---

This invention relates to improvements in the design of a low cost geophone adapted for operating efficiently in picking up sound vibrations which are transmitted through the ground.

An object of the invention is to provide a small, low cost transducer which may efficiently pick up underground vibrations such as may be set up by the passage of vehicles, troops or small numbers of soldiers over the surrounding terrain.

A further object of this invention is to provide an electroacoustic transducer to serve efficiently under military environment as a geophone in which the maximum sensitivity lies in the lower audible frequency range between 10 c.p.s. and 1000 c.p.s.

A further object of this invention is to provide a geophone design which includes a spike-like tip to which is attached a mechanically resonant electroacoustic vibrating system which responds to the mechanical vibrations transmitted through said tip antenna.

A further object of this invention is to combine in a small self-contained unit, an electroacoustic transducer to serve as an efficient geophone combined with a small modular amplifier and self-contained radio transmitter.

Other objects and advantages of the invention will become evident by the reading of the specification. The novel features that disclose my inventions are set forth with particularly in the appended claims. The invention both as to its organization and method of operation, as well as advantages thereof will be understood from the following description of several embodiments thereof when read in connection with the accompanying drawings, in which:

Figure 1:
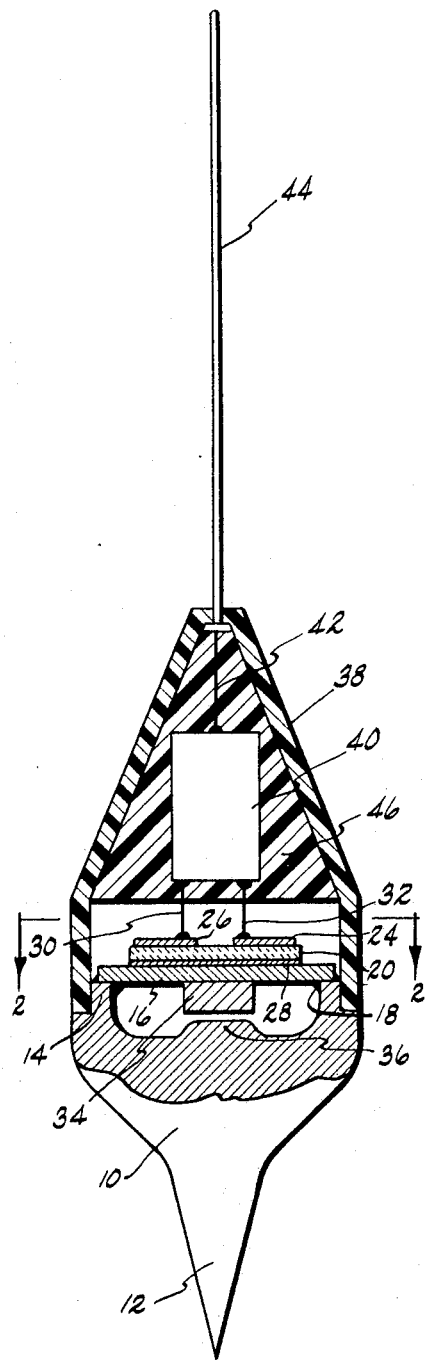
FIGURE 1 is a partial vertical cross section of one form of my invention which incorporates a sensitive geophone and a self-contained radio transmitter.
Figure 2:
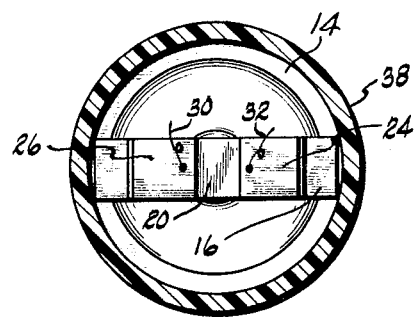
FIGURE 2 is a view taken along the lines of 2—2 of FIGURE 1.

Referring more particularly to the figures in which the same reference characters will be used to illustrate the same part when it appears in different figures. The reference character 10 in FIGURE 1 is a solid housing containing a spike-like section tip 12 and which is preferably metallic so that the section tip 12 may easily penetrate into the ground. The upper portion of the housing 10 terminates in a thin cylindrical annulus portion 14 which is also shown in the view of FIGURE 2. In one preferred form of my invention, I attach the opposite ends of a thin rectangular metallic plate 16 to the rim portion 14 by means of cement 18 which may be one of the many high strength epoxy type cements that are in wide spread use for bonding metallic surfaces. The rectangular element or strip 20 composed of an electromechanical transducer material such as a polarized strip of barium titanate or lead zirconate titanate or other suitable piezoelectric material which has the properties of converting alternating mechanical stresses to alternating electrical signals is affixed to the plate 16. The polarized ceramic element or strip 20 is shown with two separated electrodes 24 and 26 on the exposed face of the strip. A continuous electrode 28 is placed on the opposite face of the element 20 which is then bonded by cement to the surface of the plate 16. The bonding of piezoelectric element 20 to plate 16 may be made by using an epoxy cement which also serves to insulate the electrode 28 from the plate 16. The use of the separated electrodes on one side of the transducer element 20 improves the sensitivity of the vibrating system and also simplifies the electrical connections from the transducer element to the amplifier circuit. During the polarization of the piezoelectric element 20, the opposite polarizing potential leads are connected across the electrodes 24 and 26. A center tap between the high voltage terminal is connected to the common electrode 28. By this method of polarization I obtain an A-C signal across terminals 30 and 32 respectively during the vibration of the composite plate 16 and element 20 which is double the signal that would be generated were a continuous electrode used on each of the opposite faces of the piezoelectric element 20 and the polarizing potential applied between both faces of the piezoelectric element 20 in the conventional fashion. By the conventional method of polarization, in addition to obtaining one half of the voltage which I obtain across the separated electrodes, I would have an additional problem arising from the necessity of bringing out a lead from the common electrode 28 which in my preferred embodiment of the separated electrodes is not necessary.

The A-C signals are picked up from the electrodes 24 and 26 by menas of the wire terminals 30 and 32 which are soldered to the electrodes 24 and 26 as shown in FIGURES 1 and 2. A more complete description of the use of separated electrodes on one side of a section of a polarized piezoelectric ceramic element is given in my co-pending application Ser. No. 523,780 filed Jan. 28, 1966. This structure is set forth in the description as directed to FIGURE 3 and FIGURE 4 of the co-pending application.

A metallic weight member 34 is shown attached to the lower side of member plate 16. The weight member 34 may be bonded to the surface of the plate 16 with epoxy cement or by any other suitable means. The weight member 34 may be used, if necessary, to adjust the resonant frequency of the vibrating system to a desired value which may be lower than the resonant frequency of the bi-laminar structure of the combination of the plate 16 and element 20.

In order to operate as a geophone, the vibrating system should have maximum sensitivity in the lower audible frequency range since it is well known that the higher frequencies will rapidly attenuate through the ground; and, therefore, if the geophone is to be used for the detection of troop movement or vehicle movements over the surrounding terrain, the range of sensitivity is greately enhanced by increasing the sensitivity of the transducer in the lower audible frequency region.

I have found that if the resonant system of the vibrating system is set to a value below one kilocycle per second and preferably somewhere in the range between fifty cycles and five hundred cycles that the detection capability of the geophone to vibrations caused by the movement of vehicles or troops is greatly enhanced.

The structure shown in FIGURE 1 is designed so that it may be dropped by air over a terrain in which information is desired regarding activity over the ground. For such air drop applications, it is desirable to include a restraining surface 36 which is closely spaced to the weight member 34 so that upon a high G impact of the section tip 12, the bending of the bi-laminar plate 16 and element 20 assembly is limited by the weight member 34 striking against the restraining surface 36. The maximum spacing between the weight member 34 and the surface 36 is set to be within the permissible limits through which the vibratile bi-laminar assembly can move without fracturing.

For applications where geophones are to be used in areas of combat where remote indication is desired of the activity over the terrain, it is desirable to have a small modular radio transmitter assembled within a housing structure 38 which may be a molded plastic shell. The assembly 40 schematically represents a conventional amplifier and radio transmitter to which the terminal leads 30 and 32 are attached. An antenna lead 42 is connected to an antenna 44 which projects through the shell housing structure 38 as shown. A plotting compound 46 may be used to encapsulate the electronic assembly 40 within the structure 38. The circuits used between the output leads 30 and 32 and antenna 44 are not indicated since many are well known; and this invention is not concerned with electronic means for accomplishing the amplification or radio transmission of the earth borne signals. The shell-like housing structure 38 may be cemented and sealed to the outer periphery of housing 10 by means of epoxy cement or other suitable means.

Figure 3:
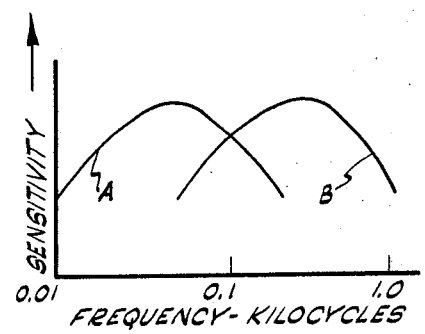
FIGURE 3 is a graph showing the typical frequency response characteristic for the geophone for efficiently detecting underground vibrations.

FIGURE 3 shows the response characteristic of the geophone assembly of FIGURE 1 and how the point of maximum sensitivity may be varied from B to A by increasing the magnitude of the weight member 34. It has been mentioned that the preferred region of maximum sensitivity should lie below one kilocycle per second in order to achieve good performance of the geophone in detecting ground disturbances such as are caused by the motion of vehicles or troops.

The design of the geophone with the weighted sharp section tip 12 is an ideal shape for dropping these units on to terrain which may be covered with grass or jungle growth in which the penetration of the sharp point will effectively go through the grass or vegetation and penetrate the ground so that proper coupling will be established to the ground vibrations which are desired to be measured.

An alternative configuration which may be adapted for the sharp tip and housing construction is to substitute a molded or formed plastic housing for the housing 10 and mold a spike member 12 into the plastic housing. The restraining surface 36 may either be a molded surface of the housing 10 or an extension of the spike member 12.

Primarily, one of the basic requirements is to develop a means for coupling the transducer to the ground surface; and the protusion into ground may be accomplished by mechanically coupling the spike member 12 to the ground surface. In the event the transducer is dropped in an area which is damp or covered with a shallow water layer the unit would be coupled by the water and/or mud encasement having the antenna positioned in an upright transmitting manner. Alternative coupling methods may be used; however, these aforementioned arrangements are deemed practical in deploying a water tight encased transducer geophonic system.

Although I have chosen only a few examples to illustrate the basic principles of my invention, it will be obvious to those skilled in the art that numerous departures may be made from the details shown, and I, therefore, desire that my invention shall not be limited except insofar as is made necessary by the prior art and by the spirit of the appended claims.

I claim:

1. In combination in an electroacoustic transducer capable of being coupled to the ground surface for detecting ground vibrations, a rigid base housing, means for coupling said housing to the ground surface to pick-up the vibrations thereof, a vibratile element capable of converting picked-up mechanical vibrations to electrical oscillations, and means for supporting said vibratile element at the periphery thereof by attaching a portion of said vibratile element to said base housing so that the picked-up vibrations of said base housing are transferred to said attached vibratile element, the resonant frequency of said vibratile element lying in the frequency range below one kilocycle per second.

2. The invention set forth in claim 1 further characterized in that said vibratile element includes a plate of polarized ceramic piezoelectric material as the transducer material.

3. The invention set forth in claim 1 further characterized in that said vibratile element includes two rectangular plates bonded together to form a composite bi-laminar structure, one of said rectangular plates comprising a polarized ceramic material.

4. In combination in an electroacoustic transducer, a rigid base housing, said base housing having an elongated external shape extending to a tapered area capable of being coupled to the ground surface, a vibratile assembly comprising a bi-laminar plate wherein one part of said plate is a piezoelectric element capable of converting mechanical vibrations to electrical oscillations, a part of said vibratile assembly is attached by being bonded at its periphery to a portion of said base housing in a manner that the vibrations of said base housing are imparted to said vibratile assembly, and electrical conducting means attached to said piezoelectric element across which electrical oscillations appear corresponding to the mechanical vibrations of said base housing.

5. In combination in an electroacoustic transducer, a rigid base housing, said base housing having an elongated external shape extending to a tapered area capable of being coupled to the ground surface, a vibratile assembly comprising a bi-laminar plate wherein one part of said plate is a piezoelectric element capable of converting mechanical vibrations to electrical oscillations, a part of said vibratile assembly is attached to a portion of said base housing in a manner that the bivrations of said base housing are imparted to said vibratile assembly, and electrical conducting means attached to said piezoelectric element across which electrical oscillations appear corresponding to the mechanical vibrations of said base housing, and further characterized in that a mechanical restraining surface is provided near the inner center of said base housing such that the maximum deflection of said vibratile assembly is limited for high impact acceleration forces applied at the tapered area of said base housing and said limited deffection being of a magnitude less than a deflection magnitude which would approach the fracturing strength of the piezoelectric material.

6. The invention set forth in claim 4 further characterized in that a weight member is attached to the free vibrating portion of said vibratile assembly.

7. In combination an electroacoustic transducer, a rigid base housing having an upper peripheral rim portion and a lower elongated tapered area, a rectangular bi-laminar vibratile assembly including at least one plate which is a piezoelectric element, means for mounting said vibratile assembly to said peripheral rim portion and electrical conducting means connected to said piezoelectric element.

8. The invention set forth in claim 7 further characterized in that the piezoelectric element is a polarized ceramic material and the resonant frequency of said mounted vibratile assembly is in the frequency region below one kilocycle per second.

9. The invention set forth in claim 7 including a weight member attached to the vibrating portion of said mounted vibratile assembly.

10. The invention set forth in claim 9 characterized in that the resonant frequency of said vibratile assembly is in the range between fifty and five hundred cycles per second.

11. The invention set forth in claim 7 further characterized in that said piezoelectric element has affixed at least two separate electrodes on the exposed surface of said assembly and further characterized in that opposite polarizing potentials are applied to the separated electrodes with reference to the common polarity applied to the single electrode on the opposite face of said ceramic element during polarization.

12. The invention set forth in claim 7 including an upper housing structure having an open surface which mates with the rim portion of said rigid base housing, an amplifier assembled within said housing structure, said amplifier having input and output terminals, the input amplifier terminals being connected to the electric terminals from said piezoelectric element, the output from said amplifier connected to a radio transmitter and the signals therefrom connected to a radiating antenna positioned externally to said housing structure and sealing means for attaching said housing structure to said rigid housing.

13. The invention set forth in claim 12 wherein the inner surface of sadi rigid housing is provided with a restraining surface to limit the impact deflection of said vibratile assembly.

References Cited

UNITED STATES PATENTS

| | | | |
|---|---|---|---|
| 1,802,781 | 4/1931 | Sawyer et al. | 179—110 |
| 1,892,147 | 12/1932 | Hayes | 340—17 |
| 2,683,867 | 7/1954 | Vann | 340—17 |
| 3,266,011 | 8/1966 | Massa | 340—10 X |

FOREIGN PATENTS

| | | |
|---|---|---|
| 1,171,162 | 5/1964 | Germany. |

BENJAMIN A. BORCHELT, *Primary Examiner.*

P. A. SHANLEY, *Assistant Examiner.*